Sept. 25, 1945.　　　　M. A. WHITING　　　　2,385,670

DYNAMOELECTRIC MACHINE

Filed Feb. 19, 1944　　　　2 Sheets-Sheet 1

Inventor:
Max A. Whiting,
by Harry E. Dunham
His Attorney.

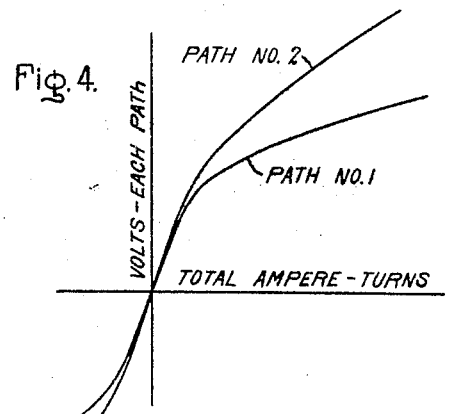
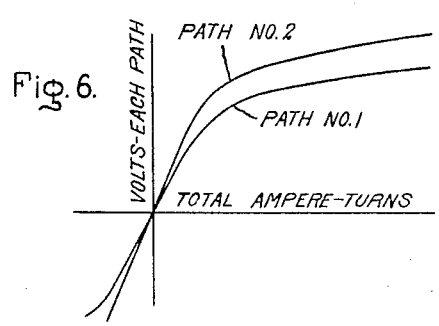
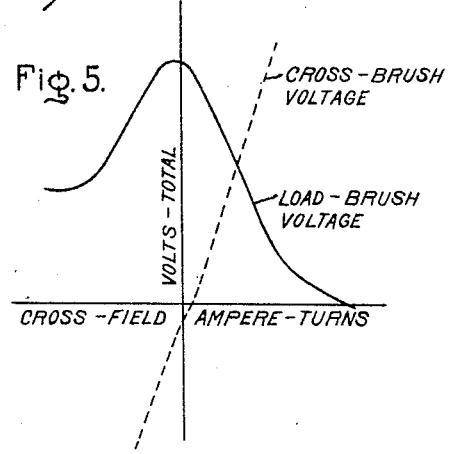
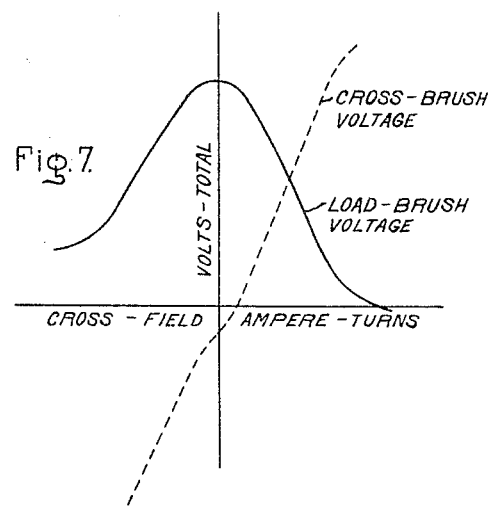
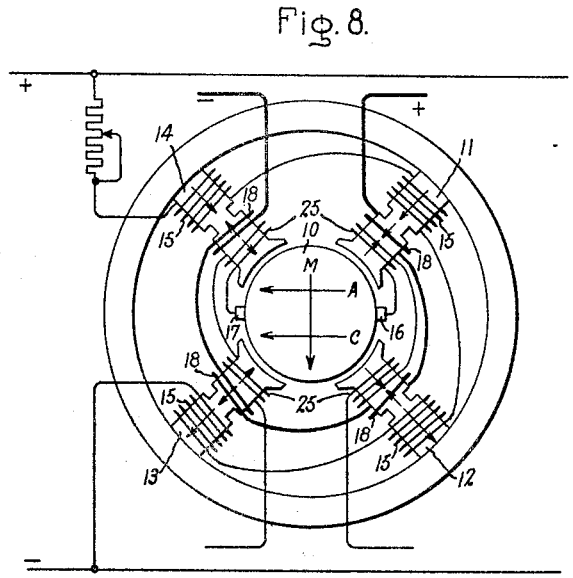

Patented Sept. 25, 1945

2,385,670

UNITED STATES PATENT OFFICE 2,385,670

DYNAMOELECTRIC MACHINE

Max A. Whiting, Schenectady, N. Y., assignor to General Electric Company, a corporation of New York Application February 19, 1944, Serial No. 523,048

22 Claims. (Cl. 171—223)

My invention relates to dynamoelectric machines and particularly to generators adapted to be used for the control of other machines, either as exciters or as main generators.

An object of my invention is to provide an improved dynamoelectric machine having an excitation system utilizing a reference field and a second field which is adapted to be varied in direction and magnitude so as to provide a maximum load voltage of the machine when the second field is a minimum and to provide for a decrease in voltage with an increase in the second field, irrespective of the direction of the energizing current of the second field.

Another object of my invention is to provide an improved field excitation system for a generator of the above type.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 1:
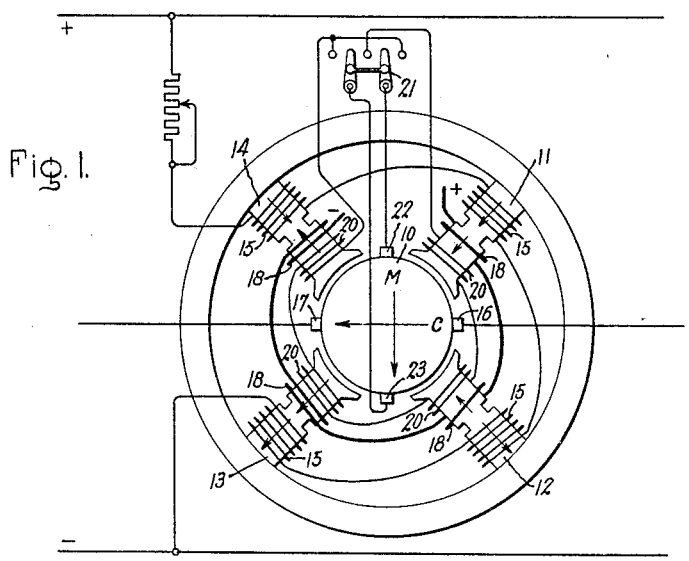
Figure 2:
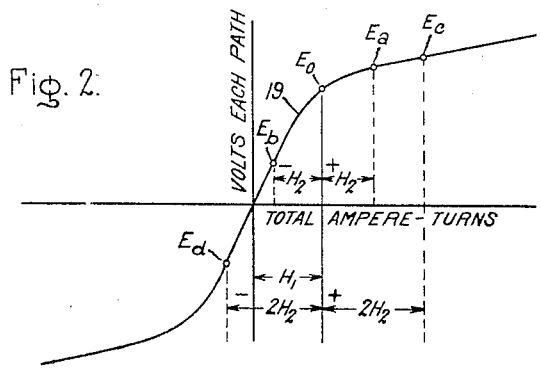
Figure 3:
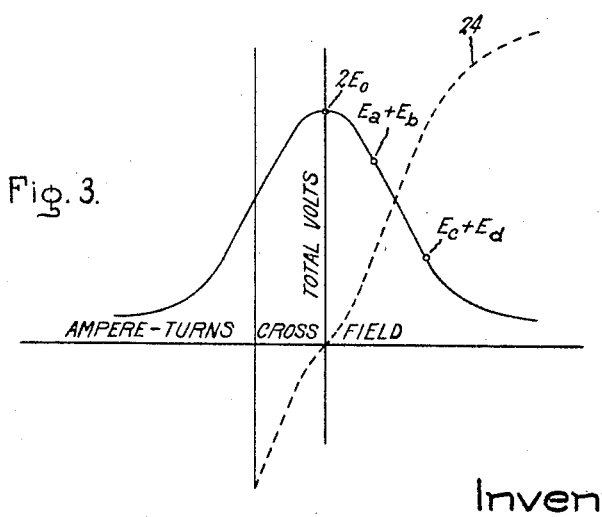

In the drawings, Fig. 1 is a schematic representation of a dynamoelectric machine provided with an embodiment of my improved excitation system; Fig. 2 shows characteristic curves of a generator of the type shown in Fig. 1; Fig. 3 illustrates other characteristics of a generator such as that shown in Fig. 1; Figs. 4, 5, 6, and 7 illustrate other characteristics of generators similar to that shown in Fig. 1; and Fig. 8 is a schematic representation of another embodiment of my invention.

The dynamoelectric machine described and claimed in this application can be used in a system such as that described and claimed in my copending application Serial No. 519,929, Control systems, filed January 27, 1944, and assigned to the assignee of this application.

Referring to the drawings, I have shown a dynamoelectric machine which may be used as an exciter as described in my above copending patent application or as a main generator. In this illustration, the dynamoelectric machine is shown as comprising a bipolar armature 10 and a field structure having four pole pieces 11, 12, 13, and 14. The armature may be wound for more than two poles, but in any case, the number of pole pieces should be twice the number of armature poles. As illustrated in Fig. 1, each field pole is divided into two pole pieces, sufficiently separated so that field windings may intervene at four approximately equal intervals about the field structure, and, furthermore, so that magnetic leakage between the tips of adjacent pole pieces will not be excessive. Except where stated to be otherwise, the pole pieces and associated elements of the magnetic circuit are to be considered as substantially duplicates. A degree of artificial saturation of the pole pieces is usually provided. In Figs. 1 and 8 this is indicated by the notches in the pole pieces.

The pole pieces have two essential sets of field exciting windings, of which a field exciting winding 15 is separately excited from a substantially constant voltage source. This field exciting winding 15 is so arranged that its excitation is of one polarity for example, "north" on the two upper pole pieces 11 and 14, and of the opposite polarity, i. e., "south," on the two lower pole pieces 12 and 13. The net or resultant direction of this excitation is that of the arrow M, which is designated as the main field axis. Usually, but not necessarily, the field exciting winding 15 is provided with an equal number of turns on all pole pieces.

The armature 10 is provided with a set of main load brushes 16 and 17 which are indicated in the drawings in the commutating positions of the armature conductors and not at the actual physical locations of the brushes relative to the pole pieces.

A second field exciting winding 18 is arranged on the same pole pieces which carry the winding 15 and the coils of this winding 18 are so placed and connected that if they alone were excited, the two right-hand pole pieces 11 and 12 would both have the same polarity; for example, "north," and two left-hand pole pieces 13 and 14 would have the opposite polarity, i. e., "south." The net or resultant direction of the component of excitation developed by the winding 18 is that of the arrow C which may be said to be along the cross-field axis, so that the winding 18 may be referred to as the cross-field. The excitation produced by this cross or auxiliary field is adapted to be variable in magnitude and direction and, therefore, is not shown connected in a circuit. The field exciting winding 18 may be connected in a control circuit, in series with the armature load brushes 16 and 17, or in circuit with a load such as driving motors. Generally, this field exciting winding 18 consists of a few turns arranged equally on all of the pole pieces and carries a relatively large current. The polarities of the field energizing currents shown in Fig. 1 are for illustrative purposes only and provide components of excitation by the reference field exciting winding 15 and the cross-field exciting winding 18 which are cumulative on the diametrically oposite pole pieces at the upper right and lower left in Fig. 1 and differential on the other pole pieces. A substantial fraction of the total magnetic reluctance is in the air gap. By construction, a large part of the iron reluctance, particularly at high excitation, is in the pole pieces which, as pointed out in the foregoing, will usually be made of restricted cross section. Therefore, it is approximately correct to consider the magnetic flux through pole pieces 11 and 13 as occupying a path which is independent of the flux path through the pole pieces 12 and 14. The flux path through the pole pieces 11 and 13 may be referred to as excitation path No. 1, and the flux path through the pole pieces 12 and 14 may be referred to as the excitation path No. 2.

In explaining the characteristics of the exciter, it is assumed that the armature IR drop and armature reaction are negligible, as, for example, when no load is connected to the armature or when these factors are counteracted or compensated by suitable means. Commutating poles usually are used, but are not shown in the drawings in order to simplify the illustrations. Such commutating poles may be of suitable conventional design. The no load magnetization curve of each of the two flux paths is represented by curve 19, Fig. 2. The ampere-turns produced by the separately excited field winding 15 are represented by $H_1$, and the component voltage generated as a result of the ampere-turns $H_1$ of one flux path are represented by $E_0$. When the cross-field 18 is unexcited, the total voltage generated in the main axis is $2E_0$ as shown in Fig. 3. When the cross-field 18 is excited to the degree represented by $H_2$, this excitation upon the pole pieces 11 and 13 adds to the original excitation $H_1$, as indicated in Fig. 2 by $+H_2$. In the excitation flux path No. 1, this leads to an increase of generated voltage from the original value $E_0$ to a value $E_a$. In pole pieces 12 and 14, this excitation by the cross-field winding 18 opposes the excitation $H_1$ as indicated in Fig. 2 by $-H_2$. In the excitation flux path No. 2, this leads to a reduction in generated voltage from the original value $E_0$ to the value $E_b$. Because of increasing saturation in excitation path No. 1, the increase in voltage from $E_0$ to $E_a$ is relatively small, but because of decreasing saturation in excitation path No. 2, the decrease of voltage from $E_0$ to $E_b$ is larger. Hence the total voltage now generated, which is the sum of the voltages $E_a$ and $E_b$, Fig. 3, is less than the original value of $2E_0$.

If the cross-field excitation is increased to a value of $2H_2$, the voltage generated by the excitation of the flux path No. 1 undergoes only a slight increase from $E_a$ to $E_c$, owing to increasing saturation. However, the excitation flux path No. 2 becomes substantially unsaturated, and accordingly the voltage generated by the excitation flux path No. 2 undergoes a large decrease. In fact, it reverses from the value $E_b$ to the value $E_d$. The total voltage, which is the sum of $E_c$ and $E_d$, Fig. 3, is, therefore, greatly reduced. Thus, for the foregoing polarity of excitation of the cross-field, the characteristic of voltage generated versus cross-field ampere-turns is similar to that portion of the curve 19 on the right-hand side of the zero axis in Fig. 3. In other words, the voltage varies generally in inverse relationship to the cross-field excitation, and if the cross-field exciting winding is energized by an armature current, it varies inversely as that armature current.

One of the novel features of the invention appears when a reversal of the polarity of the current in the cross-field is considered. Under this condition, the voltage generated by the flux in excitation path No. 2 increases but its increase is limited by increasing saturation, in the same manner and to substantially the same extent as previously described for path No. 1. Conversely, the voltage now generated by the flux in the excitation path No. 1 decreases and its decrease is augmented by decreasing saturation in the same manner and to substantially the same extent as previously described for path No. 2. Thus, the total voltage generated decreases in a like manner as before, and the characteristic of voltage generated for variations of ampere-turns of the cross-field tends to be symmetrical about the zero axis, as illustrated in Fig. 3.

The separate excitation of field 15 which is represented by $H_1$ in Fig. 2 may appropriately be supplied at a moderately greater or substantially smaller value than illustrated in Fig. 2. The resulting characteristics will be similar, in general, to those of Fig. 2, but of course different in their specific values. If the excitation $H_1$ of the separately excited field winding 15 is increased, the voltage generated in the main axis, i. e., at the load brushes of the generator, will have a higher maximum and will be higher at each value of cross-field than in Fig. 2. Conversely, at an excitation of field 15, which is less than that represented by $H_1$, the maximum main axis voltage will be less and the voltage at each value of cross-field will be less than illustrated in Fig. 3.

In some instances, it may be desirable to provide an additional field exciting winding 20, Fig. 1, to provide an additional buck or boost to one or the other of the two excitation paths. This field exciting winding is arranged to be connected by a reversing switch 21 for energization in either direction by a second set of brushes 22 and 23 connected across the armature 10 in quadrature with the load brushes 16 and 17. In some instances it may be desirable to connect this field exciting winding 20 for energization in only one direction or even to have it deenergized. The voltage across the brushes 22 and 23 is the difference of the voltages generated in the armature winding by excitation path No. 1 and excitation path No. 2; that is, this voltage is equal to the difference between the voltages induced in the armature by the sum of the two components of excitation provided by the field exciting windings 15 and 18 in excitation path No. 1 and by the difference between these two components of excitation in flux path No. 2. This voltage is indicated by curve 24 in Fig. 3. From this curve, it can be seen that the voltage across the brushes 22 and 23 is approximately proportional to the excitation of the cross-field C, and that as the polarity of the cross-field reverses, the voltage across the brushes 22 and 23 also reverses. Thus, the excitation produced by the field exciting winding 20 may be used to assist in controlling the effectiveness of the cross-field C.

In the above, the effect of hysteresis has been neglected, and from a practical standpoint, this is approximately correct with high grade annealed steel. When the magnet frame and pole pieces are of the customary grades of steel, processed in the usual manner, I have observed that upon repetitions of identical values and polarity of cross-field excitation the voltages delivered by brushes 16 and 17 may differ slightly, these discrepancies depending upon differences in value and polarity of the immediately preceding cross-field currents. Such discrepancies as I have found, however, are not large nor particularly detrimental. When it is desired to minimize these discrepancies, grades of steel for the magnet frame and pole pieces should be selected having low hysteresis and for the very best results should be given a magnetic anneal.

It may be found desirable for certain operating conditions to reduce the generated voltage to zero for large values of armature load current, particularly for one direction of flow of the armature current. This may be obtained by an unsymmetrical winding arrangement by providing more turns along one excitation path than along the other excitation path to either the field exciting windings 15 or 18. This can also be obtained by designing the magnetic circuit to provide a high degree of saturation in one excitation path and only a slight degree of saturation in the other excitation path. Fig. 4 shows no-load saturation curves for the respective excitation paths when they are designed for different degrees of saturation, and Fig. 5 illustrates the resultant generated volts as compared to the cross-field or energization of the field exciting winding 18. As an alternative construction for the same purpose, the pole arc of the pole pieces of one excitation path may be made wider than that for the pole pieces of the other excitation path, so that when the cross-field excitation is zero, one flux path provides a substantially greater flux than the other flux path. This is illustrated by the characteristics in Fig. 6 which show the magnetization curves for a machine in which excitation path No. 2 has a greater pole arc and proportionately greater cross section of pole pieces than that for excitation path No. 1, but in which the reference field exciting winding 15 and the cross-field exciting winding 18 are formed with equal numbers of turns on each pole piece, and in which equal degrees of saturation are used for all pole pieces. With this arrangement, the volts generated by the load brushes varies as shown in Fig. 7 relative to the cross-field excitation or the energization of the cross-field exciting winding 18, so that the load voltage passes through zero for certain high flux values of the cross-field.

In some instances armature reaction may be found to have a more than negligible effect on the operation of the machine unless its effect is counteracted by suitable means. The armature reaction due to load current in the armature 10 is effective in the cross-axis, as shown by the arrow A in Fig. 8; in other words, the armature reaction adds to, or subtracts from, the effect C of the current in cross-field exciting winding 18. In some uses of my invention, winding 18 may be connected in series with load brushes 16 and 17, in which case the current causing the armature reaction is the same as that which energizes the cross-field exciting winding 18. Accordingly, the effect of armature reaction may be substantially offset by changing the number of turns of cross-field correspondingly, and the addition of a separate compensating winding is superfluous. In other uses of my invention, for example in arrangements shown in my copending application, Serial No. 519,929 mentioned above, the current of brushes 16 and 17 is distinct from that of cross-field 18 and the variations of the respective currents are disproportionate. For such conditions, a substantially correct compensation for armature reaction may be provided by a compensating field exciting winding 25 as shown in Fig. 8, connected in series with brushes 16 and 17 and having polarities upon the various pole pieces as indicated by the arrows. If a compensating field exciting winding 25 is added to the construction of Fig. 1, it is apparent that the armature reaction by reason of the current of cross-brushes 22 and 23 is not compensated by winding 25. However, the maximum magnitude of this current is relatively small so that compensation for the armature reaction of this current is unimportant.

In some uses of my invention, it may be advantageous to offset, approximately, the effect of internal IR drop of the machine, that is to say, of its armature and its field windings in series with its armature. This may be done by adding a winding upon each pole piece, to be connected in series with load brushes 16 and 17 in the same manner as in an ordinary compound wound generator. However, an equally good compounding effect to offset the internal IR drop can be provided by utilizing and properly proportioning the field exciting winding 25 of Fig. 8. Since this field exciting winding 25 is cumulative with the field exciting winding 15 on pole pieces 12 and 14, the number of turns of winding 25 may be made the sum of the numbers of turns individually suitable for compensation and compounding respectively on these pole pieces; and since the field exciting winding 25 is differentially arranged relative to the field exciting winding 15 on pole pieces 11 and 13, the number of turns of winding 25 may be made the difference of the numbers of turns individually suitable for compensation and compounding respectively on these latter pole pieces.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A generator having an armature and a separately excited reference field exciting winding, means including a second field exciting winding arranged to produce a component of excitation in quadrature with the component of excitation produced by said reference field exciting winding, and means for energizing said second field exciting winding responsive to armature load current for varying the output voltage of said generator in inverse relationship to the current of said second field winding for either direction of flow of said current.

2. A generator having an armature and a separately excited reference field exciting winding, means including a second field exciting winding arranged to produce a component of excitation in quadrature with the component of excitation produced by said reference field exciting winding, and means for energizing said second field exciting winding responsive to armature load current for varying the output voltage of said generator in inverse relationship to the current of said armature for either direction of flow of said current.

3. A generator having an armature and an excitation system including a reference field producing means for producing substantial saturation of said field excitation system, and a second field producing means including a field exciting winding arranged on said generator and connected for producing a component of excitation responsive to armature load current variable in magnitude and direction for producing a maximum voltage across said armature with a minimum value of excitation by said variable field producing means and a decrease in voltage with increase of excitation by said variable field producing means irrespective of the direction of said variable excitation relative to said reference field producing means.

4. A generator having an armature and a field excitation system including a reference field producing means having a field exciting winding energized by a substantially constant voltage source for producing substantial saturation of said field excitation system, and a second field producing means including a second field exciting winding arranged on said generator and connected for producing a component of excitation responsive to armature load current variable in magnitude and direction for producing a maximum voltage across said armature with a minimum value of excitation by said variable field producing means and a decrease in voltage at a substantial rate with increase of excitation by said variable field producing means irrespective of the direction of said variable excitation relative to said reference field producing means.

5. A generator having an armature and a field excitation system including a reference field producing means having a field exciting winding energized by a substantially constant voltage source for producing substantial saturation of said field excitation system, a second field producing means including a second field exciting winding arranged on said generator and connected for produing a component of excitation responsive to armature load current variable in magnitude and direction for producing a maximum voltage across said armature with a minimum value of excitation by said variable field producing means and a decrease in voltage at a substantial rate with increase of excitation by said variable field producing means irrespective of the direction of said variable excitation relative to said reference field producing means, and a third field producing means including a third field exciting winding for producing a component of excitation responsive to the difference between the voltages induced in said armature by the sum of the components of excitation of said first two field producing means and by the difference between the components of excitation of said first two field producing means.

6. A generator having an armature with load brushes, two pairs of pole pieces, one pair of said pole pieces arranged on each side of the axis of said brushes, a reference field exciting winding for exciting one of said pairs of pole pieces for the same polarity and the other of said pairs of pole pieces for the opposite polarity, and means including a second field exciting winding energized by the armature load current of said generator arranged on said pole pieces cumulatively with said reference winding on two diametrically opposite pole pieces and differentially on the other two pole pieces for producing a voltage at said load brushes which varies in inverse relationship to the armature current of said generator for either direction of flow of said current.

7. A generator having an armature with load brushes, two pairs of pole pieces, one pair of said pole pieces arranged on each side of the axis of said brushes, a reference field exciting winding for exciting one of said pairs of pole pieces for the same polarity and the other of said pair of pole pieces for the opposite polarity, and means including a second field exciting winding arranged on said pole pieces cumulatively with said reference winding on two diametrically opposite pole pieces and differentially on the other two pole pieces, means for energizing said second field exciting winding responsive to the load current of said armature for producing a voltage at said load brushes which varies in inverse relationship to the armature current of said generator for either direction of flow of said current.

8. A generator having a bipolar armature and load brushes, an excitation system including four pole pieces arranged two on each side of the axis of said load brushes, a separately excited reference field exciting winding for exciting the pole pieces on one side of said brush axis to one polarity and the pole pieces on the other side of said brush axis to the opposite polarity and exciting all of said pole pieces to a substantial degree of saturation, and a second field exciting winding on said pole pieces excited by the armature load current of said generator cumulatively with said reference field exciting winding on two diametrically opposite pole pieces on opposite sides of said brush axis and differentially with the reference field exciting winding on the other two pole pieces for generating a voltage in said armature which varies inversely relative to an armature current of said generator for either direction of flow of said current.

9. A generator having an armature and a field excitation system including a reference field producing means having a field exciting winding for producing substantial saturation of said field excitation system, a second field producing means variable in magnitude and direction responsive to the load current of said armature for producing a maximum voltage across said armature with a minimum value of excitation by said variable field producing means and a decrease in voltage at a substantial rate with increase of excitation by said variable field producing means irrespective of the direction of said variable excitation relative to said reference field producing means, and a third field producing means responsive to the difference between the voltages induced in said armature by the sum of the components of excitation of said first two field producing means and the difference between the components of excitation of said first two field producing means.

10. A generator having an armature with load brushes, two pairs of pole pieces, one pair of said pole pieces arranged on each side of the axis of said brushes, a reference field exciting winding for exciting one of said pairs of pole pieces for the same polarity and the other of said pair of pole pieces for the opposite polarity, and means including a second field exciting winding arranged on said pole pieces cumulatively with said reference winding on two diametrically opposite pole pieces and differentially on the other two pole pieces means for energizing said second field exciting winding by a current variable in magnitude and direction responsive to load current in said armature for producing a maximum voltage at said load brushes with a minimum value of excitation by said second field exciting winding and a decrease in voltage with increase of excitation by said second field exciting winding irrespective of the direction of the excitation thereof relative to said reference field exciting winding.

11. A generator having an armature and a field excitation system including a reference field producing means having a field exciting winding energized by a substantially constant voltage source for producing substantial saturation of said field excitation system, a second field producing means variable in magnitude and direction responsive to the load current of said armature for producing a maximum voltage across said armature with a minimum value of excitation by said variable field producing means and a decrease in voltage at a substantial rate with increase of excitation by said variable field producing means irrespective of the direction of said variable excitation relative to said reference field producing means, a third field producing means responsive to the difference between the voltages induced in said armature by the sum of the components of excitation of said first two field producing means and the difference between the components of excitation of said first two field producing means, and a fourth field producing means responsive to the load current of said armature for producing a component of excitation in opposition to armature reaction from load current in said armature.

12. A generator having an armature with load brushes, two pairs of pole pieces, one pair of said pole pieces arranged on each side of the axis of said brushes, a reference field exciting winding for exciting one of said pairs of pole pieces for the same polarity and the other of said pair of pole pieces for the opposite polarity, means including a second field exciting winding energized by a current variable in magnitude and direction and arranged on said pole pieces cumulatively with said reference winding on two diametrically opposite pole pieces and differentially on the other two pole pieces for producing a maximum voltage at said load brushes with a minimum value of excitation by said variable field producing means and a decrease in voltage with increase of excitation by said variable field producing means irrespective of the direction of said variable excitation relative to said reference field exciting winding, means including auxiliary brushes arranged in quadrature with said load brushes for commutating the difference between the voltages induced in said armature by the cumulative components of excitation of said field exciting windings and the differential components of excitation of said field exciting windings, a third field exciting winding, and means for connecting said third field exciting winding across said auxiliary brushes for energization by said difference in voltages cumulatively or differentially relative to said second field exciting winding.

13. A generator having an armature with load brushes, two pairs of pole pieces, one pair of said pole pieces arranged on each side of the axis of said brushes, a reference field exciting winding for exciting one of said pairs of pole pieces for the same polarity and the other of said pair of pole pieces for the opposite polarity, means including a second field exciting winding energized by a current variable in magnitude and direction and arranged on said pole pieces cumulatively with said reference winding on two diametrically opposite pole pieces and differentially on the other two pole pieces for producing a maximum voltage at said load brushes with a minimum value of excitation by said variable field producing means and a decrease in voltage with increase of excitation by said variable field producing means irrespective of the direction of said variable excitation relative to said reference field exciting winding, means including auxiliary brushes arranged in quadrature with said load brushes for commutating the difference between the voltages induced in said armature by the cumulative components of excitation of said field exciting windings and the differential components of excitation of said field exciting windings, a third field exciting winding, and reversible means for connecting said third field exciting winding across said auxiliary brushes for energization by said difference in voltages cumulatively or differentially relative to said second field exciting winding.

14. A generator having an armature with load brushes, two pairs of pole pieces, one pair of said pole pieces arranged on each side of the axis of said brushes, a reference field exciting winding for exciting one of said pairs of pole pieces for the same polarity and the other of said pairs of pole pieces for the opposite polarity, means including a second field exciting winding energized by a current variable in magnitude and direction and arranged on said pole pieces cumulatively with said reference winding on two diametrically opposite pole pieces and differentially on the other two pole pieces for producing a maximum voltage at said load brushes with a minimum value of excitation by said variable field producing means and a decrease in voltage with increase of excitation by said variable field producing means irrespective of the direction of said variable excitation relative to said reference field exciting winding, and means including a third field exciting winding energized responsive to the load brush current having turns on said first-mentioned diametrically opposite pole pieces equivalent to the sum of turns necessary for compounding said reference field for load current voltage drop in said armature and for opposing load current armature reaction and having turns on said other pole pieces equivalent to the difference between the turns necessary for compounding said reference field for load current voltage drop in said armature and for opposing load current armature reaction.

15. An excitation system for a generator having an armature, including a reference field producing means and a second field producing means variable in magnitude and direction responsive to load current in said armature for producing a maximum voltage across said armature with a minimum value of excitation by said variable field producing means and a decrease in voltage with increase of excitation by said variable field producing means irrespective of the direction of said variable excitation relative to said reference field producing means.

16. An excitation system for a generator having an armature, including a reference field producing means and a second field producing means variable in magnitude and direction responsive to the load current of said armature for producing in combination a maximum voltage across said armature with a minimum value of excitation by said variable field producing means and a decrease in voltage at a substantial rate with increase of excitation by said variable field producing means irrespective of the direction of said variable excitation relative to said reference field producing means.

17. An excitation system for a generator having an armature, comprising a reference field producing means including a field exciting winding energized by a substantially constant voltage source, and a second field producing means including a field exciting winding energized by a current variable in magnitude and direction responsive to load current in said armature for producing in combination a maximum voltage across said armature with a minimum value of excitation by said variable field producing means and a decrease in voltage with increase of excitation by said variable field producing means irrespective of the direction of said variable excitation relative to said reference field producing means.

18. An excitation system for a generator having an armature, including a reference field producing means, a second field producing means variable in magnitude and direction responsive to load current in said armature for producing a maximum voltage across said armature with a minimum value of excitation by said variable field producing means and a decrease in voltage at a substantial rate with increase of excitation by said variable field producing means irrespective of the direction of said variable excitation relative to said reference field producing means, and a third field producing means responsive to the difference between the voltages induced in said armature by the sum of the components of excitation of said first two field producing means and the difference between the components of excitation of said first two field producing means.

19. An excitation system for a generator having an armature, comprising a reference field producing means including a field exciting winding energized by a substantially constant voltage source, a second field producing means including a field exciting winding energized by a current variable in magnitude and direction for producing in combination a maximum voltage across said armature with a minimum value of excitation by said variable field producing means and a decrease in voltage at a substantial rate with increase of excitation by said variable field producing means irrespective of the direction of said variable excitation relative to said reference field producing means, and a third field producing means responsive to the load current of said armature for producing a component of excitation in opposition to armature reaction resulting from load current in said armature.

20. An excitation system for a generator having an armature, including a reference field producing means and a second field producing means variable in magnitude and direction for producing a maximum voltage across said armature with a minimum value of excitation by said variable field producing means and a decrease in voltage at a substantial rate with increase of excitation by said variable field producing means irrespective of the direction of said variable excitation relative to said reference field producing means, a third field producing means responsive to the difference between the voltages induced in said armature by the sum of the components of excitation of said first two field producing means and the difference between the components of excitation of said first two field producing means, and a fourth field producing means responsive to the load current of said armature for producing a component of excitation in opposition to armature reaction resulting from load current in said armature.

21. An excitation system for a generator having an armature, comprising a reference field producing means including a field exciting winding energized by a substantially constant voltage source, a second field producing means including a field exciting winding energized by a current variable in magnitude and direction for producing in combination a maximum voltage across said armature with a minimum value of excitation by said variable field producing means, and a decrease in voltage at a substantial rate with increase of excitation by said variable field producing means irrespective of the direction of said variable excitation relative to said reference field producing means, a third field producing means responsive to the difference between the voltages induced in said armature by the sum of the components of excitation of said first two field producing means and the difference between the components of excitation of said first two field producing means, and a fourth field producing means responsive to the load current of said armature for producing a component of excitation in opposition to armature reaction resulting from load current in said armature and for producing a component of excitation in cumulatively compound relation to said reference field.

22. An excitation system for a generator having an armature, comprising a reference field producing means including a field exciting winding energized by a substantially constant voltage source, a second field producing means including a field exciting winding energized by a current variable in magnitude and direction for producing in combination a maximum voltage across said armature with a minimum value of excitation by said variable field producing means and a decrease in voltage at a substantial rate with increase of excitation by said variable field producing means irrespective of the direction of said variable excitation relative to said reference field producing means, a third field producing means including a field exciting winding energized in accordance with the difference between the voltages induced in said armature by the sum of the components of excitation of said first two-mentioned field producing means and the difference between the components of excitation produced by said first two-mentioned field producing means, and a fourth field producing means including a field exciting winding energized in accordance with the load current of said armature for producing a component of excitation in opposition to armature reaction resulting from load current in said armature.

MAX A. WHITING.